May 3, 1960     S. W. BRADSTREET     2,935,316

INTERSTELLAR SPACE ILLUSION DEVICE

Filed Jan. 9, 1956     2 Sheets-Sheet 1

Inventor
Samuel W. Bradstreet

May 3, 1960  S. W. BRADSTREET  2,935,316
INTERSTELLAR SPACE ILLUSION DEVICE
Filed Jan. 9, 1956  2 Sheets-Sheet 2

Inventor
Samuel W. Bradstreet
by Hill, Sherman, Meroni, Gross & Simpson
Attys

United States Patent Office 2,935,316
Patented May 3, 1960

2,935,316

INTERSTELLAR SPACE ILLUSION DEVICE

Samuel W. Bradstreet, Oak Park, Ill.

Application January 9, 1956, Serial No. 558,072

3 Claims. (Cl. 272—17)

This invention relates to an interstellar space illusion device and more particularly to a toy rocket ship incorporating the device for creating the illustion of travel through interstellar space.

The idea of space travel has a great natural fascination for children which is intensified by stories in comic strips, comic books, children's books and magazines and radio and television programs. However, no devices have been heretofore available which would simulate space travel with any degree of accuracy.

It is therefore an object of this invention to provide a device which will produce the illusion of travel through interstellar space.

Another object of this invention is to provide a toy rocket ship incorporating an interstellar space illusion device.

According to this invention means are provided for producing a plurality of pin points of light representative of stars in space together with means for causing such pin points to move in a manner to produce the illusion of movement through space. Preferably, the pin points of light are at various spacings from a viewing axis and the pin points are caused to move radially outwardly from such axis. If one were able to travel at sufficiently high speeds in outer space, stars not in the direct line with the direction of movemnet would appear to move outwardly as approached. Accordingly, moving the pin points of light outwardly from the viewing axis accurately simulates travel in space and gives the illusion of movement along the viewing axis. The illusion is such that children have been found to become entranced with the device of this invention.

A feature of the invention is in the provision of shield means arranged to be disposed between a light source and the eye of the viewer, such shield means including means for passing the pin points of light from the source and means for causing movement of the pin points.

According to a more specific features of the invention, a pair of light shields are arranged to be disposed between a light source and the eye of the viewer with means being provided for effecting relative rotation of the shields about a viewing axis. Means are provided defining narrow transparent slits on the shields with the slits on one shield being angularly related to the slits on the other for creating pin points of light at the inner section of the slits, which move radially outwardly or inwardly with relative rotation of the shields. It should be noted that outward movement of the pin points simulates forward travel while inward movement simulates rearward travel.

In some circumstances, it may be desirable to rotate both shields but it is usually preferable to rotate only one shield with the rotating shield being provided with spiral transparent slits and with the stationary shield being provided with radially extending slits.

Another feature of the invention is in the provision of means for creating flashes of light of short duration to simulate meteorites or the like. In the arrangement in which a pair of shields are used, such is readily accomplished by providing transparent dots or relatively short slits in one or both of the shields to produce flashes of light as they intersect the slits. It may be noted that if one were actually able to travel in outer space, it is considered unlikely that any flashes of light (such as caused by meteorites and viewed on earth) would be observed. However, providing the flashes of light produce a very spectacular and fascinating display, particularly when combined with the moving pin points of light.

An important feature of the invention is in the provision of a toy rocket ship with the illusion device as above described. According to this feature, a rocket ship is provided having a hollow body with a seat therein so positioned that the user may look forwardly within the hollow body. The illusion device is positioned in the forward end of the body in the nose portion of the ship. With this arrangement, it appears to the user that he is looking out through an opening in the nose of the ship. This combination is additionally advantageous in that the hollow body forms a tube-like light shield minimizing undesirable light on the device and enhancing the illusion effect.

The rocket ship is preferably provided with a spring suspension to allow the user to rock the ship in operation, which has been found to be particularly advantageous in combination with the illusion device.

This invention contemplates other objects, features and advantages which will become more fully apparent from the following detailed description taken in conjunction with the accompanying drawings which illustrate preferred embodiments and in which:

Figure 5 is a wiring diagram for a modified arrangement; and

Figure 1:
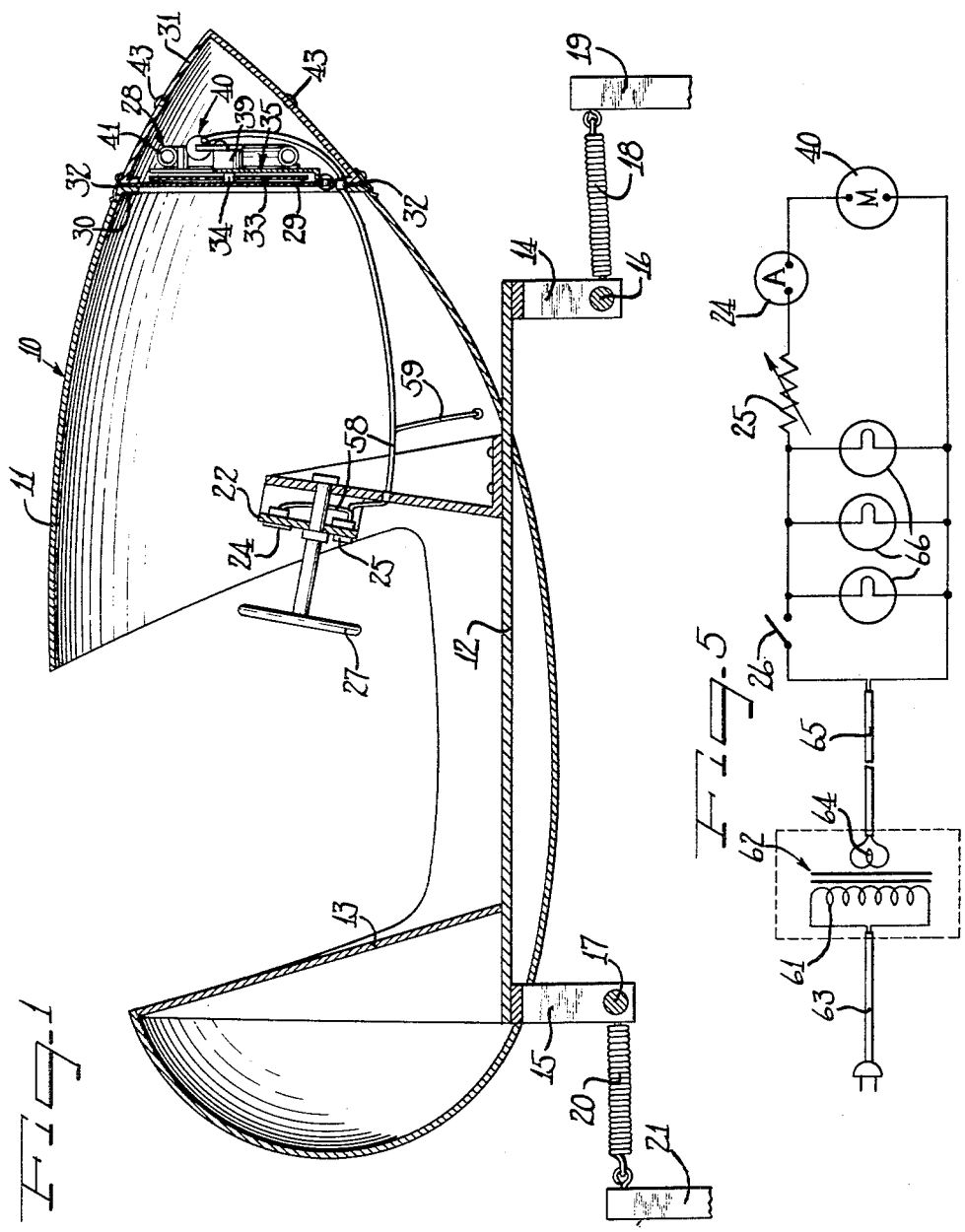
Figure 1 is a longitudinal sectional view through a toy rocket ship incorporating an interstellar space illusion device, according to the principles of this invention.
Figure 2:
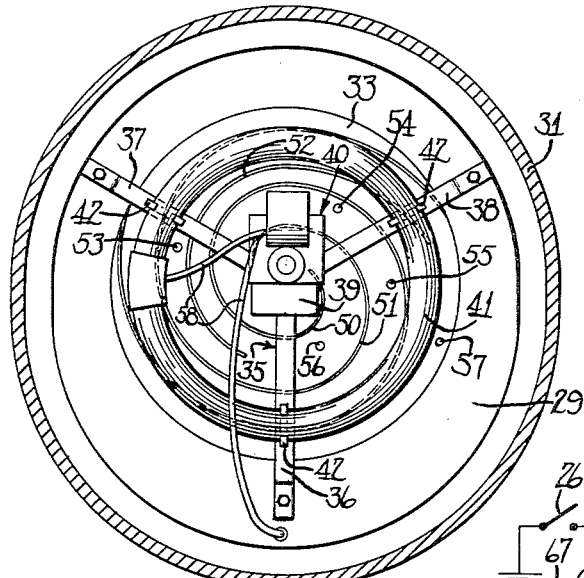
Figure 2 is a sectional view taken substantially along line II—II of Figure 1.

Reference numeral 10 generally designates a toy rocket ship constructed according to the principles of this invention. The rocket ship 10 comprises a hollow body 11 and a board 12 disposed within the body 11 to provide a seat for the user with a back rest 13 being secured to the board 12. The board 12 forms the main frame member of the ship and the forward and rearward ends thereof are supported through brackets 14 and 15 on bars 16 and 17. One end of the bar 16 is connected to a spring 18 to a post 19 and one end of the bar 17 is similarly connected through a spring 20 to a post 21. The posts 19 and 21 are part of a main support frame and it will be understood that the other ends of the bars 16 and 17 are supported through springs from other posts of such frame, in the conventional manner of support of hobby horses.

The top and side wall portions of the body 11 are open above the seat and in use, the feet of the user may extend outside the body and rest on the bracket 14 or the bar 16.

Figure 4:
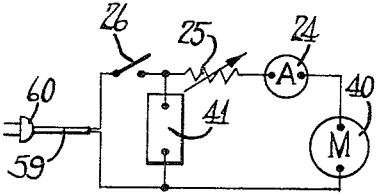
Figure 4 is a wiring diagram for the rocket ship of Figure 1.
Figure 6:
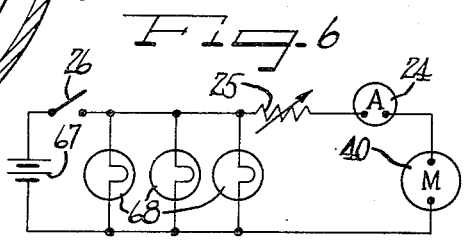
Figure 6 is a wiring diagram for another modified arrangement.

An instrument panel 22 is supported on an upright standard 23 secured to the board 12 and carries a speed indicator 24, a speed control device 25 and an on-off switch 26 (shown only in the wiring diagrams of Figures 4–6). The panel 22 may also support a steering wheel 27 which may be used in connection with the illusion device as will be described, but preferably functions only to give the user something with which to imagine steering control.

The body 11 preferably extends above the seat to a height sufficient for a child to be able to look forwardly within the body and see an interstellar space illusion device generally designated by reference numeral 28 which is disposed in the nose portion of the ship. The instrument panel 22 should, of course, be low enough so as not to obstruct the view.

The device 28 comprises a panel 29 secured to an annular flange portion 30 of the body 11 with a separate conically shaped hollow nose piece 31 being secured to the body 11 by clips 32 in engagement with the outer peripheral portion of the forward surface of the panel 29.

A disk 33 is disposed in front of the panel 29 and is secured at its center to a shaft 34 which is journaled for rotation on a generally horizontal axis by a bracket 35 having three legs 36, 37 and 38 projecting radially outwardly beyond the periphery of the disk 33 and secured at their ends against the forward surface of the panel 29.

Any suitable means may be provided for rotating the disk 33. In the illustrated embodiment, a gear reduction unit 39 is used to couple an electric motor 40 to the shaft 34, the unit 39 also serving to support the motor 40 from the bracket 35.

A circular fluorescent lamp 41 is secured by clips 42 to the legs 36, 37 and 38 of the bracket 35 to provide a light source, the disk 33 and the panel 29 being thus disposed between a light source and the child seated in the rocket ship. Any other light source may be used. For example, the nose piece 31 may be removed, or made of transparent material, and an external natural or artificial light source may be used instead of or in addition to the lamp 41. With the nose piece 31 of opaque material, jewel glass units 43 may preferably be provided thereon to enhance the external appearance of the rocket ship and indicate when the lamp 41 is operating.

Figure 3:
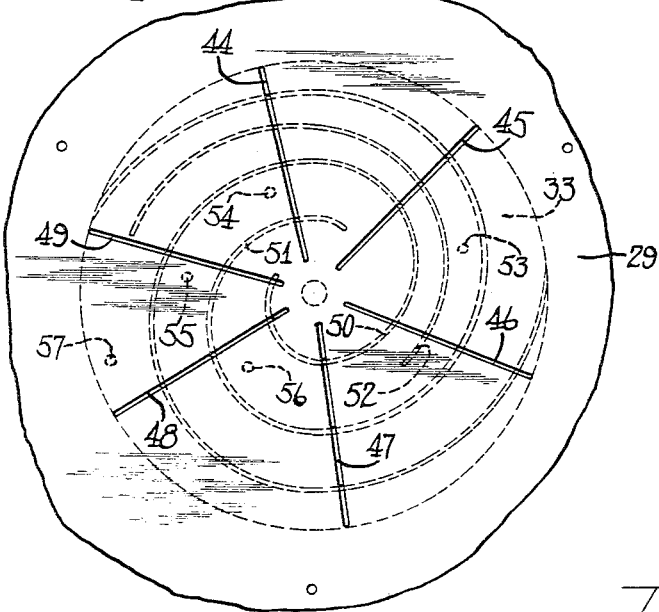
Figure 3 is a sectional view taken substantially along line III—III of Figure 1.

To obtain the illusion of travel through space, means are provided defining a plurality of transparent slits 44–49 in the panel 29 which extend radially outwardly from the axis of rotation of the disk 33, and means are provided defining transparent slits 50–52 in the disk 33 extending spirally outwardly from the axis of the disk 33. At the junction between the slits 44–49 and the slits 50–52, pin points of light will be visible to a child in the rocket ship and with rotation of the disk 33, such pin points will move radially toward or away from the axis of rotation. For example, with clockwise rotation of the disk 33 as viewed in Figure 3, pin points of light created at the junctions of the slits will move radially outwardly to create the illusion of forward travel through space.

The exact form of the spiral slits is not critical and depends upon the illusion desired. The shorter the spiral, the smaller the required speed of rotation, and in this respect it is desirable to have a relatively long spiral. However, if the spiral is too long, the viewer may be able to follow the spiral to destroy the illusion, particularly if the radial slits are relatively close together.

Momentary flashes of light are produced by providing transparent spots in either the panel 29 or the disk 33, preferably in the disk 33. In the illustrated embodiment spots 53–57 are provided in the disk 33. The spots may be either circular as illustrated or elongated to some extent, depending upon the duration of flash desired.

The slits 44–52 and spots 53–57 may be formed in any desired manner, as by providing openings in opaque members, or covering transparent members with an opaque paint or other material except for the slits and spots. In the illustrated embodiment, the panel 29 is of an opaque material provided with openings therein to define the slits 44–49, and the disk 33 is of a transparent material covered with paint with openings in the paint to define the spiral slits 50–52. The facing surfaces of the panel 29 and disk 33 should be as close together as possible and should be as highly light absorbent as possible.

The speed-indicating device 24 preferably is in the form of an ammeter connected in series with the motor 40 and the speed controlling device 25 preferably is in the form of a rheostat also connected in series with the motor 40. Wiring 58 is provided for interconnecting the ammeter 24, rheostat 25, switch 26, motor 40 and lamp 41, and connecting the same to a cord 59 for connection to a suitable source of electric current. As diagrammatically illustrated in Figure 4, a plug 60 is provided on the end of the cord 59 for connection to a conventional source of electric current, such as a source of 110 volt, 60 cycle alternating current. One side of the line is connected to one terminal of the motor 40 and one terminal of the lamp 41 while the other side of the light is connected through the on-off switch 26 to the other terminal of the lamp 41 and through the rheostat 25 and ammeter 24 to the other terminal of the motor 40. It will be appreciated that as the resistance of the rheostat 25 is decreased, the current through the motor 40 will be increased to increase the speed thereof, which increase will be indicated on the ammeter 24. Increasing the speed of rotation of the motor 40 creates the illusion of increased speed of movement through space. Thus a very accurate simulation of speed control is obtained.

In some circumstances, it may be undesirable to apply high voltage to the rocket ship, since it is used by children apt to tear the wiring apart and obtain shocks. For this reason, a circuit such as shown in Figure 5 may be used in which the primary 61 of a step-down transformer 62 is arranged to be connected through a cord 63 to a suitable source of current, the transformer 62 having a low voltage secondary winding 64 connected through a cord 65 to the rocket ship and through the switch 26, rheostat 25, and ammeter 24 to the motor 40. Since fluorescent lights generally require a relatively high operating voltage, one or more incandescent lamps 66 may be substituted for the fluorescent lamp 41.

Another modified circuit is illustrated in Figure 6 in which a battery 67 is connected through the on-off switch 26, the rheostat 25, and the ammeter 24 to the motor 40. In this case one or more incandescent lamps 68 may be used.

The steering wheel 27 might be connected to the illusion device 28, either to cause shifting of the axis of the device, or rotation of the panel 29 about its axis. However, such would greatly increase the cost of manufacture of the device and the illusion obtained is not as accurate as would be desired. The illustrated arrangement is therefore preferred.

It will be apparent that the arrangement of this invention will create an accurate illusion of travel through space and it will be further apparent that the device is relatively simple in construction and operation.

It will be understood that modifications and variations may be effected without departing from the spirit and scope of the novel concepts of this invention.

I claim as my invention:

1. In a toy rocket ship, a hollow body in the general shape of a rocket ship, a seat in said body arranged to support the user in position to look forwardly within said body, light shield means arranged in the forward end of said body to extend between the eye of the user and a light source, said shield means including means for passing pin points of light from the light source, and means for causing movement of said pin points of light to simulate interstellar space travel.

2. In a toy rocket ship, a hollow body in the general shape of a rocket ship, a seat in said body arranged to support the user in position to look forwardly within said body, light shield means arranged in the forward end of said body to extend between the eye of the user and a light source, said shield means including means for passing pin points of light from the light source, and means for causing movement of said pin points of light to simulate interstellar space travel, and spring suspension means for said body to permit rocking movement thereof.

3. In a toy rocket ship, a hollow body in the general shape of a rocket ship, a seat in said body arranged to support the user in position to look forwardly within said body, a pair of light shields arranged in the forward end of said body to extend between the eye of the user and a light source, means for effecting relative rotation of said shields about a viewing axis, means defining narrow transparent slits on said shields extending outwardly from said axis with the slits on one shield being angularly related to the slits on the other for creating pin points of light moving radially outwardly with relative rotation of said shields, and means for varying the relative speed of rotation of said shields to vary the apparent speed of travel through space.

References Cited in the file of this patent

UNITED STATES PATENTS

| | | |
|---|---|---|
| 763,428 | Sax | June 28, 1904 |
| 838,989 | Hart | Dec. 18, 1906 |
| 1,796,903 | Wheeler et al. | Mar. 17, 1931 |
| 2,147,232 | Ballew | Feb. 14, 1939 |
| 2,356,191 | Weiss | Aug. 22, 1944 |
| 2,409,938 | Hutter | Oct. 22, 1944 |
| 2,455,020 | McQuaid | Nov. 30, 1948 |
| 2,661,211 | Campbell | Dec. 1, 1953 |